United States Patent
Denneler et al.

(10) Patent No.: US 11,790,620 B2
(45) Date of Patent: Oct. 17, 2023

(54) METHOD AND SYSTEM FOR AUGMENTED REALITY WI-FI COVERAGE MAP

(71) Applicant: ARRIS ENTERPRISES LLC, Suwanee, GA (US)

(72) Inventors: Charles Ross Denneler, Lawrence, KS (US); Joseph D. Jacobs, Lawrence, KS (US); Satyasree Muralidharan, Lawrence, KS (US); Steven Nicolai, Lawrence, KS (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/960,242

(22) Filed: Oct. 5, 2022

(65) Prior Publication Data

US 2023/0036297 A1     Feb. 2, 2023

Related U.S. Application Data

(63) Continuation of application No. 17/411,218, filed on Aug. 25, 2021, now Pat. No. 11,488,370.

(60) Provisional application No. 63/086,811, filed on Oct. 2, 2020.

(51) Int. Cl.
*G06T 19/00*     (2011.01)
*H04W 4/029*     (2018.01)

(52) U.S. Cl.
CPC .......... *G06T 19/006* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 9,462,423 | B1 | 10/2016 | Rivlin et al. |
| 2016/0345137 | A1 | 11/2016 | Ruiz |
| 2017/0090477 | A1 | 3/2017 | Akselrod et al. |

FOREIGN PATENT DOCUMENTS

| | | |
|---|---|---|
| EP | 3165939 A1 | 5/2017 |
| WO | 2011126945 A1 | 10/2011 |

OTHER PUBLICATIONS

Mangiante et al., "VR is on the Edge: How to Deliver 360" Videos, in Mobile Networks, Aug. 25, 2017, VR/AR Network 17, 30-35 (2017).

(Continued)

*Primary Examiner* — Robert J Craddock
(74) *Attorney, Agent, or Firm* — Panitch Schwarze Belisario & Nadel LLC

(57) ABSTRACT

A method, device, and computer program product for determining quality of a wireless network, includes: connecting, by a mobile device, to one or more access points of the wireless network in a physical environment; capturing, via a camera of the mobile device, a live rendering of the physical environment; generating, by the mobile device, a rendering of the physical environment; detecting, via the mobile device, a signal quality of the connection to each of the one or more access points; storing, in memory of the mobile device, each current position and a plurality of previous positions of the mobile device in the physical environment in association with the detected signal quality; and generating, in a processor of the mobile device, a virtual path graphic by linking the current positions and the plurality of previous positions of the mobile device in the physical environment.

30 Claims, 11 Drawing Sheets

(56) References Cited

OTHER PUBLICATIONS

Notification of Transmittal of the International Search Report (Forms PCT/ISA/220 and PCT/ISA/210) and the Written Opinion of the International Searching Authority (Form PCT/ISA/237) dated Dec. 7, 2021, by the International Application Division Korean Intellectual Property Office in corresponding International Application No. PCT/US2021/047483 (8 pages).

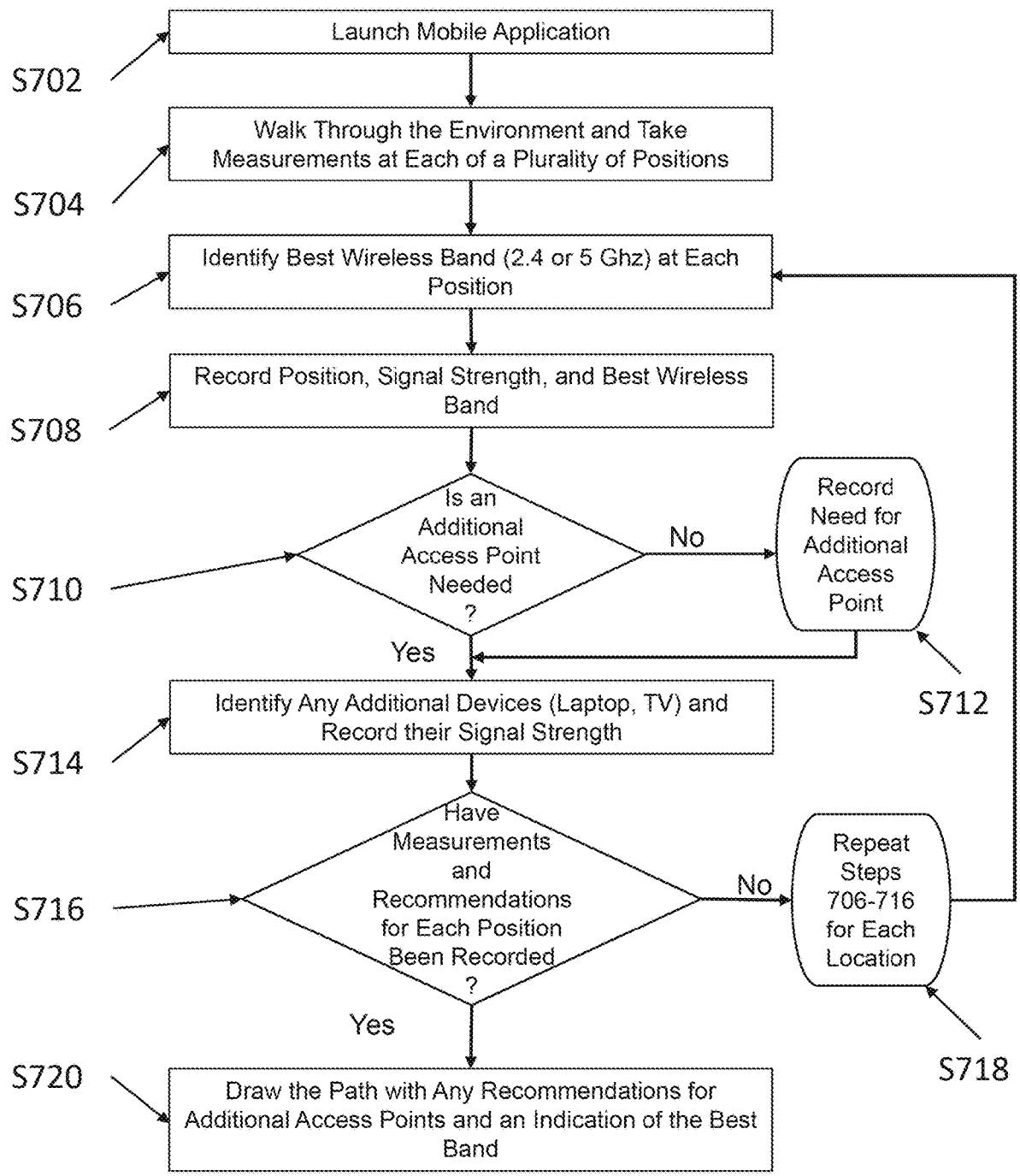

METHOD AND SYSTEM FOR AUGMENTED REALITY WI-FI COVERAGE MAP

FIELD

The present disclosure relates to a display of signal coverage in a wireless network via an augmented reality interface, and more particularly to the display of a virtual path graphic with signal quality indicators onto a live rendering of a physical environment.

BACKGROUND

As reliance on technology continues to expand, many homes and business require a robust local network for supporting a plethora of network-enabled devices. The local network can include one or more access points, which provide a portal for wireless enabled devices to connect to the network. The strength and quality of the communication link can vary in different areas or locations of the home or business due to moveable or immovable obstructions, which interfere with signal distribution. It is important that users and/or MSOs recognize the locations in a home or business where signal quality and strength may be limited or weak as the wireless-enabled devices require a receiving a communication link of a certain signal strength and quality for proper operation. Attempts to connect to the local network or communicate over the network in areas where the strength of the wireless signal is weak or impaired could impair the operation, productivity, and/or enjoyment of a wireless-enabled device.

There are various known techniques and methods for visualizing Wi-Fi coverage in a home or business. For example, Wi-Fi coverage can be visualized by generating a simple meter showing the Wi-Fi quality at the current location (e.g. Wi-Fi Sweet Spot App), a marching graph of the Wi-Fi quality as the user walks a home or business, or a graph that is typically overlaid on a floor plan of a building. Each of these solutions provides an output based on the detected signal strength or quality of a communication link between a wireless-enabled device and an access point. In certain instances, however, the generated graphics can be difficult to interpret and/or create such that they are easily understood by a user.

SUMMARY

An exemplary method for determining quality of a wireless network includes: connecting, by a mobile device, to one or more access points of the wireless network in a physical environment; generating, by the mobile device, a rendering of the physical environment; detecting, via the mobile device, a signal quality of the connection to each of the one or more access points of the wireless network in the physical environment; storing, in memory of the mobile device, each current position and a plurality of previous positions of the mobile device in the physical environment in association with the detected signal quality; and generating, in a processor of the mobile device, a virtual path graphic by linking the current positions and the plurality of previous positions of the mobile device in the physical environment.

An exemplary mobile device is disclosed comprising: a receiver configured to connect to one or more access points of a wireless network in the a physical environment; a processor configured to generate a rendering of the physical environment; an interface configured to detect a signal quality of the connection to each of the one or more access points; a memory configured to store each current position and a plurality of previous positions in association with the detected signal quality; and a the processor configured to generate a virtual path graphic by linking the current positions and the plurality of previous positions of the mobile device in the physical environment.

A non-transitory computer readable medium is disclosed having instructions operable to cause one or more processors to perform operations comprising: connecting to one or more access points of the wireless network in a physical environment; generating a rendering of the physical environment; detecting a signal quality of a connection to each of the one or more access points of the wireless network in the physical environment; storing each current position and a plurality of previous positions of the mobile device in the physical environment in association with the detected signal quality; and generating a virtual path graphic by linking the current positions and the plurality of previous positions of the mobile device in the physical environment.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIG. 7 illustrates an exemplary method for indicating the best wireless band and indicating if an additional access point is needed for a plurality of locations in a physical environment according to an exemplary embodiment of the present disclosure.

DETAILED DESCRIPTION

Exemplary embodiments of the present disclosure provide tools and methods for determining quality of a wireless network. According to an exemplary embodiment, a mobile device, such as a smart phone, can connect to one or more access points and generate, in real time, a rendering of the a current location in a physical environment. The mobile device can be configured to execute or access software or an application which can determine the quality of the wireless signal with respect to the access point to which the mobile device is connected. The quality is determined based on signal strength indicators such as RSSI, packet loss, SNR (signal to noise ratio), and/or MCS rate. The mobile device repeats this process as it moves to different locations within the physical environment and connects to the same or different access points in each respective location. Based on data collected at the different locations within the physical environment, the mobile device generates a virtual path graphic that follows a travel path of the mobile device through the physical environment. The virtual path graphic also includes a signal quality indicator for each location and access point connection along the travel path. The mobile device overlays the virtual path graphic onto the live rendering of the physical environment. As a result, the user can observe in real-time the signal quality of an access point at various locations along a travel path within the physical environment. According to additional embodiments, the mobile device can analyze the signal quality within the physical location according to the virtual path and recommend one or more locations for additional access points to improve the Wi-Fi coverage.

Figure 1:
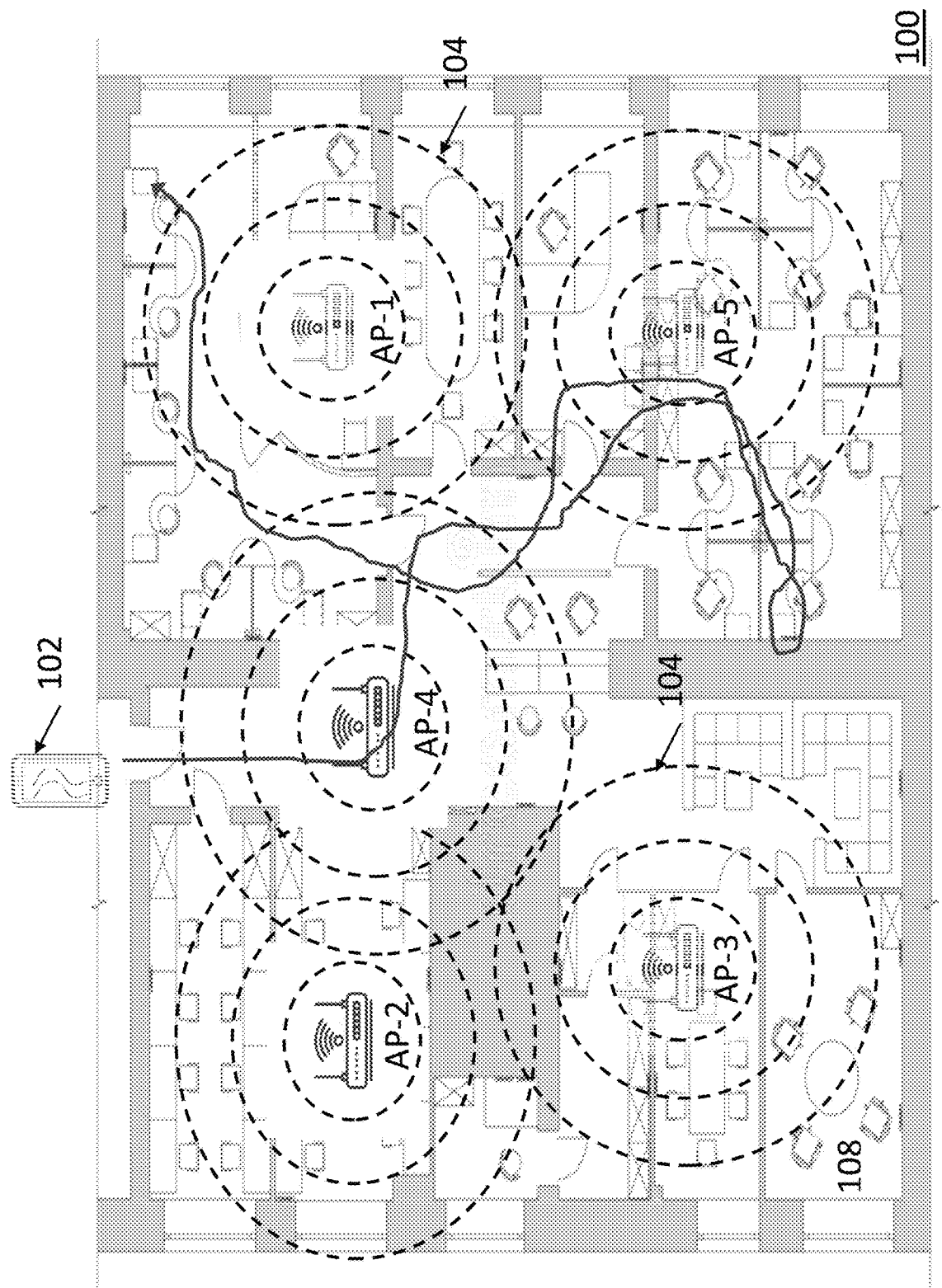
FIG. 1 is a physical environment such as a building with multiple access points, in which a mobile device generates an augmented reality Wi-Fi coverage map in accordance with an exemplary embodiment of the present disclosure.
Figure 2:
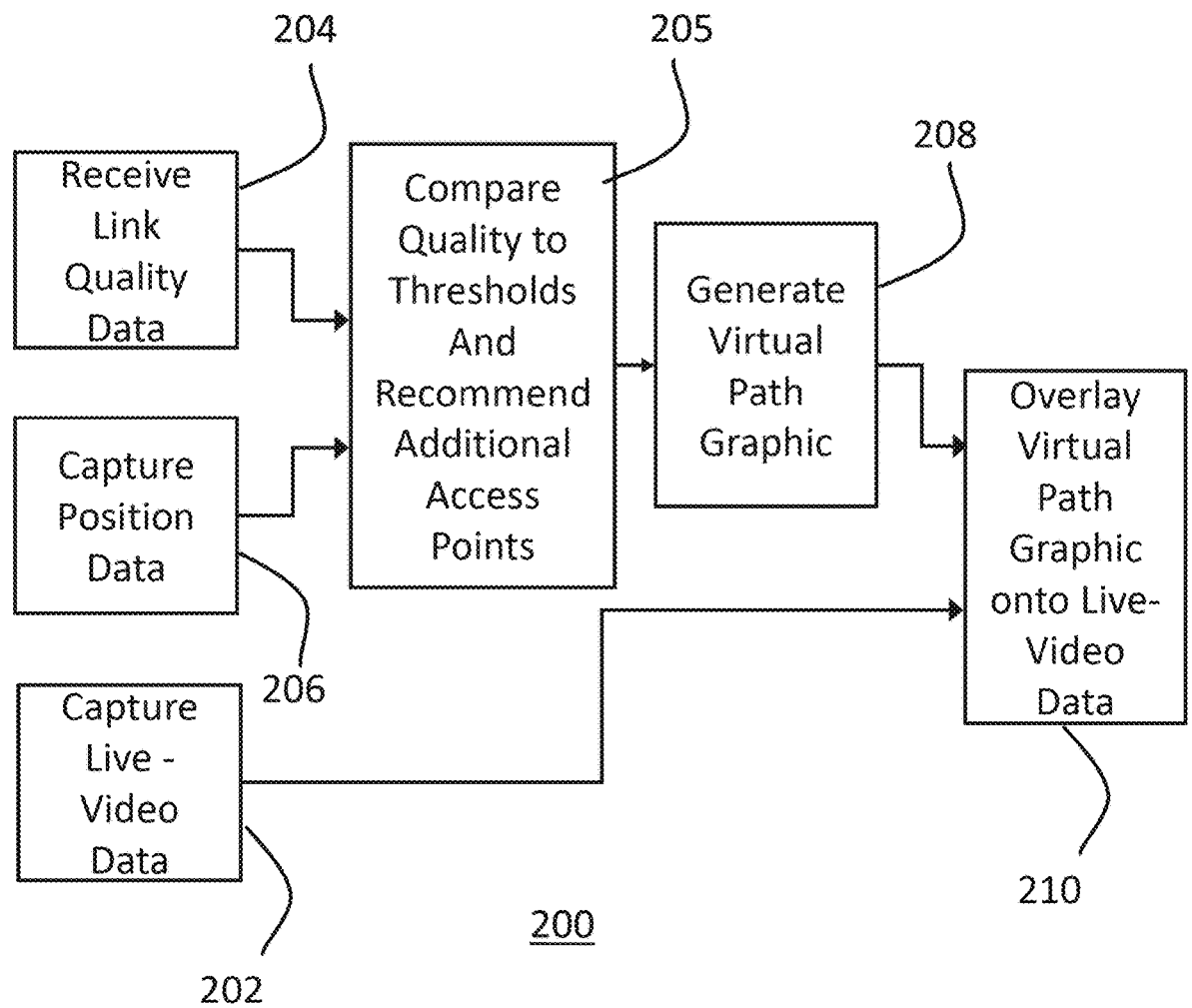
FIG. 2 is a block diagram illustrating a process flow for generating an augmented reality Wi-Fi coverage map in accordance with an exemplary embodiment of the present disclosure.

FIG. 1 illustrates a physical environment 100 such as building with a plurality of access points AP-n, in which a mobile device 102 generates an augmented reality Wi-Fi coverage map in accordance with an exemplary embodiment of the present disclosure. FIG. 2 is a block diagram illustrating a process flow 200 for generating an augmented reality Wi-Fi coverage map in accordance with an exemplary embodiment of the present disclosure.

The mobile device 102 can be configured to capture live video data 202 of a physical environment 100. For example, the mobile device 102 may be any type of computing device configured with at least a video sensor or camera suitable for capturing a live or real-time rendering of the physical environment 100. The mobile device can also be configured to include a display device for generating a user interface for displaying the live-rendering to the user. For example an exemplary mobile device 102 can include a specifically configured cellular phone, smart phone, smart watch, wearable computing device, implantable computing device, notebook computer, tablet computer, augmented reality glasses, or any other suitable mobile device for performing the functions described herein.

The mobile device 102 can connect to one or more access points AP-n of a wireless network 108 in the physical environment 100 via a wireless communication link 104. When connecting to an access point AP-n, the mobile device 102 can be configured to receive and/or access link quality data 204 and/or information related to the strength or quality of the wireless communication link 104. The wireless network 108 can be a local area network (LAN) or home network or any type of suitable wireless system for the physical environment 100, which operates on any number of radio-frequency bands. Such systems include, for example, Wi-Fi (IEEE 802.11), cellular (Universal Mobile Telecommunications System (UMTS), Long-Term Evolution (LTE), etc.), and other well-known systems. The network can operate on a plurality of frequencies/bands such as 2.4 GHz and 5 GHz (the example shown in FIG. 1). The network 108 can include a set of access points, an Ad-Hoc (mesh) system, and other known organizations of nodes. Each access point AP-n can generate wireless signals or communication links which allow client devices to communicate within the LAN. The access points AP-n can also be connected to a wide area network (WAN) and allow one or more client devices to communicate with one or more devices on the WAN. Each access point AP-n can be configured to operate as a wireless router, a wireless network extender, a cellular base station, a repeater, and other well-known access points. Alternatively, when the network is Ad-Hoc, each client device and access point on the network can act as both transmitter and receiver. The Ad-Hoc network can also include access points such as routers that assist or mange the network, but such access points are not necessary to the current invention.

The physical environment 100 can include any number of access points AP-n for providing each client device, such as mobile device 102, a wireless access to the LAN via the wireless communication link 104. The physical environment 100 can include for example a home, business, school, apartment, park, zoo, arena, stadium, or any other indoor or outdoor location or area as desired. As the mobile device 102 moves through the physical environment 100 it may also capture and store a current position 206 or location within the physical environment 100. For example, the current location can be recorded as a building or room coordinate, coordinates of a geo-spatial coordinate system, or any other suitable positional tracking scheme as desired. According to an exemplary embodiment, the position or location of the mobile device can be determined from one or a combination of signals received from the access point and/or other client devices proximally located with respect to the mobile device 102 within the physical environment 100. For example, a proximal client device can include a printer, copier, desktop computing device, table computing device, smart appliance, or any other suitable device connected to the LAN via an access point AP-n.

The mobile device 102 in an optional step 205, can compare the signal strength/quality to a predetermined threshold, to determine whether additional access points or extenders should be installed in the physical environment to improve the Wi-Fi coverage in certain locations. If it is determined that an additional access point should be added, the mobile device 102 can query the device database to determine a location proximal to the area of low signal quality where the additional access point can be installed. For example, according to an exemplary embodiment, the mobile device 102 can capture images of the area of low signal quality and perform image recognition to identify physical features or structures in or near the area of low signal quality for mounting the additional access point.

The mobile device 102 can be configured to generate a virtual path graphic 208 by linking the current positions and the plurality of previous positions of the mobile device 102 in the physical environment 100. The mobile device 102 may then combine and/or overlay the virtual path graphic with/onto the live video data 210. The virtual path graphic 208 can include information associated with the network 108 such as at least an indicator of signal strength of each access point AP-n to which the mobile device 102 is connected at respective current and previous positions within the physical environment 100. For example, the mobile device 102 can be configured to include one or more processing devices including a combination of hardware and software components suitable for executing one or more data processing, computational processing, and/or image processing algorithms for generating the virtual path graphic as described herein. The mobile device 102 can then display the live rendering of the physical environment overlaid with the virtual path graphic on a user interface.

Figure 3:
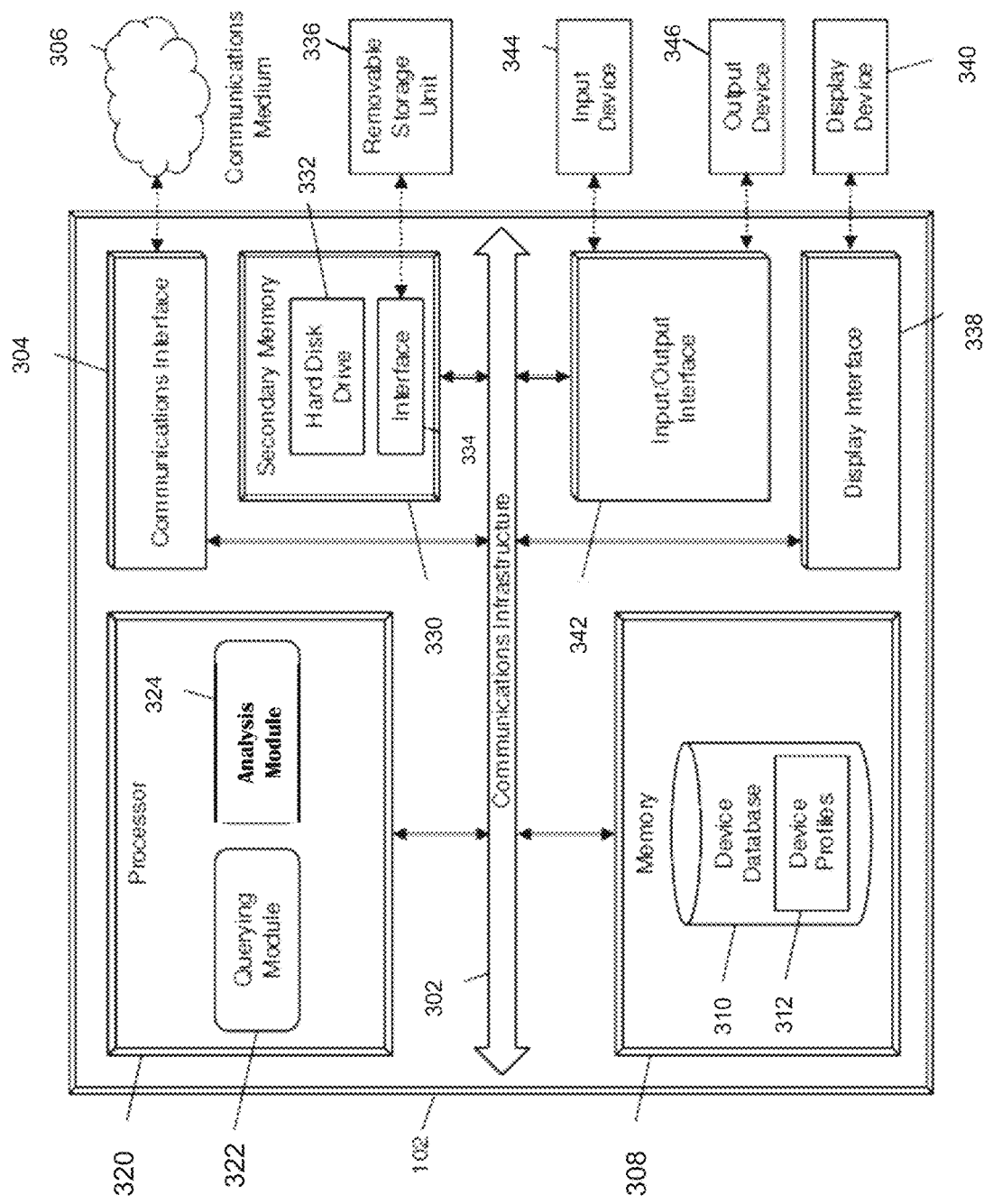
FIG. 3 is a block diagram illustrating a mobile device in accordance with an exemplary embodiment of the present disclosure.

FIG. 3 is a block diagram illustrating a mobile device 102 in accordance with an exemplary embodiment of the present disclosure.

The mobile device 102 may include a communications infrastructure 302. The communications infrastructure 302 may be configured to transmit data between modules, engines, databases, memories, and other components of the computing device 102 for use in performing the functions discussed herein. The communications infrastructure 302 may be comprised of one or more communication types and utilize various communication methods for communications among the plural sub-components, circuits, and sub-systems within the mobile device 102 as configured. For example, the communications infrastructure 302 may be comprised of a bus, contact pin connectors, wires, etc. In some embodiments, the communications infrastructure 302 may also be configured to communicate between internal components of the computing device 102 and external components of the computing device 102, such as externally connected databases, display devices, input devices, etc.

The mobile device 102 may also include a communications interface 304. The communications interface 304 may include one or more interfaces used to interact with and facilitate communications between the mobile device 102 and one or more external devices via suitable communications mediums 306. For instance, the communications interface 304 may be configured to interface with the communications infrastructure 302 and provide an interface 304 for connecting the mobile device 102 to one or more communications mediums 304 for the electronic transmission or receipt of data signals that are encoded or otherwise superimposed with data for use in performing the functions discussed herein. Communications interfaces 304 may include universal serial bus (USB) ports, Personal Computer Memory Card International Association (PCMCIA) ports, PS/2 ports, serial ports, fiber optic ports, coaxial ports, twisted-pair cable ports, wireless receivers, etc. Communications mediums 306 may include local area networks, wireless area networks, cellular communication networks, the Internet, radio frequency, Bluetooth, near field communication, etc.

In some instances, the mobile device 102 may include multiple communications interfaces 304 for electronically transmitting and receiving data signals via one or more communications mediums 306, such as a first communications interface 304 configured to transmit and receive data signals via a local area network and a second communications interface 304 configured to transmit and receive data signals via the Internet. In some instances, the communications interface 304 may include a parsing module for parsing received data signals to obtain the data superimposed or otherwise encoded thereon. For example, the communications interface 304 may include (e.g., or otherwise have access to, such as via the communications infrastructure 304) a parser program configured to receive and transform the received data signal into usable input for the functions performed by the processing device to carry out the methods and systems described herein.

The communications interface 304 may be configured to establish communication channels or links 104 with external devices, such as the access points AP-n illustrated in FIG. 1, via communication links 104 established therewith. In some cases, the communications interface 304 may provide for the transmission of user instructions as controls to the external device from the primary application program. In other cases, the communications interface 304 may provide for the transmission of user instructions from the secondary application program, where the communications infrastructure 302 of the computing device 102 may facilitate communications between the primary and secondary application programs. The communications interface 304 can include a receiver, which can determine the quality of a wireless signal by providing a received signal strength indicator (RSSI) from the power of the received signal as part of the normal reception of the wireless signal. The receiver, alternatively, could include a separate field strength meter.

The communications interface 304 can also include means, such as a positioning system, for receiving a location signal and recording the position as coordinates. The exemplary location signal can be produced by satellites in the form of a global navigation satellite system (GNSS) such as, but not limited to, a global positioning system (GPS), a space based Global Navigation Satellite System (GLONASS), Beidou Navigation Satellite System (BDS), Galileo, and other global and regional satellite navigation systems. The mobile device 102 can be configured to access or execute one or more software modules or applications, which alone or in combination with another positioning system, can provide a location within a premise, such as a building or home. Additionally the system can use a network based system that uses triangulation such as a Wi-Fi based positioning system and/or a hybrid system such as A-GPS that is provided with the mobile device 102.

The mobile device 102 may also include memory 308. The memory 308 may be configured to store data for use by the mobile device 102 in order to perform the functions discussed herein. The memory 308 may be comprised of one or more types of memory using one or more suitable types of memory storage, such as a cloud based storage or other Internet/network based storage, random access memory, read-only memory, hard disk drives, solid state drives, magnetic tape storage, etc. In some cases, the memory 308 may be a non-transitory computer readable medium, which may be configured to store data suitable for execution by the mobile device 102 in performing the functions discussed herein. The memory 308 may store data in any suitable type of configuration, such as in one or more lists, databases, tables, etc., which may store the data in a suitable data format and schema. In some instances, the memory 308 may include one or more relational databases, which may utilize structured query language for the storage, identification, modifying, updating, accessing, etc. of structured data sets stored therein.

The memory 308 of the mobile device 102 may include a device database 310. The device database 310 may be configured to store a plurality of device profiles 312 using a suitable storage format and schema. For example, the device database 310 may be a library of device profiles 312 or other types of data storage, such as may utilize a repository for the storage of device data. Each device profile 312 may be a structured data set configured to store data related to an external device (e.g., other client devices) that may be controlled via the methods discussed herein. Each device profile 312 may be configured to store, for instance, one or more captured images that have been associated with the related device during the registration process, communication data for establishing a communication channel 308 with the external device, data associated with communicating with the device's secondary application program, control settings or options, interface data for displaying an interface related to the control thereof, etc. The memory 308 may also be configured to store program data for application programs to be executed by a processor 320 of the mobile device 102, such as program code for the first application program and any secondary application programs. In some embodiments, the memory 308 may also be configured to store spatial data for use in providing virtual or simulated representations of a physical environment 100. The memory 308 may also store algorithms for use in performing image recognition, identifying other client devices in the physical environment 100 or physical features or elements in the physical environment 100 as discussed herein. According to an exemplary embodiment, the memory can also include a remote and/or removable memory device such as storage space provided at a network location or on a flash memory device.

As already discussed, the mobile device 102 may also include a processor 320. The processor 320 may be configured to perform the functions of the mobile device 102 discussed herein as will be apparent to persons having skill in the relevant art. In some embodiments, the processor 320 may include and/or be comprised of a plurality of engines and/or modules specially configured to perform one or more functions of the processing device, such as a querying module 322, detection module 324, etc. As used herein, the term "module" may be software or hardware particularly programmed to receive an input, perform one or more processes using the input, and provides an output. The input, output, and processes performed by various modules will be apparent to one skilled in the art based upon the present disclosure. The processor 320 as discussed herein may be a single processor, a plurality of processors, or combinations thereof, which may also include processors that may have one or more processor "cores." Operations performed by the processor 320 or modules included therein may be performed as a sequential process and/or be performed in parallel, concurrently, and/or in a distributed environment. In some embodiments the order of operations may be rearranged without departing from the spirit of the disclosed subject matter. The processor 320 and the modules or engines included therein may be configured to execute program code or programmable logic to perform the functions discussed herein, such as may be stored in the memory 308 and/or a secondary memory 330, discussed in more detail below.

The processor 320 of the mobile device 102 may include a querying module 322. The querying module 322 may be configured to execute queries on databases to identify information. The querying module 322 may receive one or more data values or query strings, and may execute a query string based thereon on an indicated database, such as the device database 310, to identify information stored therein. The querying module 322 may then output the identified information to an appropriate engine or module of the mobile device 102 as necessary. The querying module 322 may, for example, execute a query on the device database 310 to identify a device profile 312 and location of a device detected to be in close proximity (e.g., within a same room or area, or within a specified distance to establish peer-to-peer wireless communication over e.g., a Bluetooth connection) in the physical environment 100. The device database 310 may also be configured to store information regarding physical features of the physical environment or of other components within the physical environment, such as a shelf, power outlet, book case, ledge, desk, or other identifiable physical feature or component of the physical location as desired.

The processor 320 of the mobile device 102 may also include an analysis module 324. The analysis module 324 may be configured to detect captured images in live renderings of a physical environment 100, or, if applicable, in a simulated or virtual representation of a previously captured physical environment 100. The analysis module 324 may be configured to utilize image recognition techniques and algorithms to detect an area or object in a live rendering of a physical environment 100 that has been previously captured. The analysis module 324 may also be configured to detect external devices that may be eligible for control via the methods discussed herein, such as by monitoring for external devices located on an area network to which the mobile device 102 is connected or by monitoring for transmissions from external devices that may be received via the communications interface 304. Exemplary devices can include a television (TV), speaker, laptop, or desktop etc. In some embodiments, the analysis module 324 may also be configured to detect an external device in a live rendering of a physical environment 100 based on data associated with the external device, including image data, signal strength and/or direction, image recognition, etc. The analysis module 324 can also be configured to analyze the signal quality at various locations within the physical environment 100 and determine whether one or more additional access points are necessary to improve Wi-FI coverage. For example, if the signal quality of a wireless communication link is below a specified threshold, the analysis module 324 can recommend that an access point be installed proximal-(e.g., at or within a specified distance of) to that location for improving the signal quality. In addition, the analysis module 324 can use the identification of elements, components, or features of the physical environment 100 obtained through image recognition to determine a specific location for mounting or placing the additional access point in the physical environment 100.

In some embodiments, the mobile device 102 may also include a secondary memory 330. The secondary memory 330 may be another memory in addition to the memory 308 that may be used to store additional data for use in performing the functions of the mobile device 102 as discussed herein. In some embodiments, the secondary memory 330 may be a different format or may use a different data storage method and/or schema than the memory 308. The secondary memory 330 may be any suitable type of memory, and, in some instances, may include multiple types of memory. For instance, the secondary memory 330 may be comprised of a hard disk drive 332 and one or more interfaces 334, where the interfaces 334 are configured to transmit data to and receive data from one or more removable storage units 336. Removable storage units 336 may include, for example, floppy disks, compact discs, digital video discs, Blu-ray discs, removable hard drives, flash drives, universal serial bus drives, etc.

According to an exemplary embodiment, the mobile device 102 may also include a display interface 338. The display interface may be configured to interface the computing device 102 with one or more display devices 340. The display devices 340 may be devices configured to display data received from the mobile device 102. Display devices 340 may be any suitable type of display, including, for example, Augmented Reality display (AR) liquid crystal displays, light emitting diode displays, thin film transistor display, capacitive touch displays, or any other type of display device as desired. In some instances, the mobile device 102 may include one or more display interfaces 338, which may interface with one or more display devices 340. Display devices 340 may, for example, display live renderings of a physical environment 100 being captured by the mobile device 102, which may also include an augmented reality interface displayed thereon that may assist the user in capturing images for association with external devices, displaying indicators of detected, registered images, displaying lists of external devices for selection, displaying controls for an external device, displaying an interface for controlling an external device, etc. In some embodiments, the display device 340 may be configured to display a virtual or spatial representation of a physical environment 100 for use in performing the functions discussed herein. According to other exemplary embodiments, the display devices 340 can also be configured to display an augmented reality interface in which a virtual path generated by the processor 320 is overlaid on a live rendering of the physical environment 100. According to yet another exemplary embodiment, the display device 340 can be configured to display and interface comprised of a Wi-Fi coverage map in the form of a heat map which also identifies the location of current access points and a recommend location of additional access points.

The mobile device 102 may also include an input/output interface 342. The input/output interface 342 may be configured to interface the mobile device 102 with one or more input devices 344 and/or output devices 346 for the transmission to and receipt of data from the respective devices. The input/output interface 342 may include any suitable type of interface, and in some instances may include multiple types of interfaces, such as for interfacing with multiple types of input devices 344 and/or output devices 346. Input devices 344 may include any suitable type of device for inputting data to a mobile device 102, such as a keyboard, mouse, microphone, camera, light field camera, touch screen, click wheel, scroll wheel, remote control, accelerometer, compass, gyroscope, sensor, etc. Input devices 344 may be configured to receive input from a user of the mobile device 102, such as for the selection of an area or object in a live rendering of a physical environment 100 for use as a captured image associated with an external device. Input devices 344 may also be used by the user to select an external device for association with a captured image or for the adding of an external device into the device database 210 for future control thereof. The input devices 344 may also be configured to receive user instructions for the control of an external device, such as may be transmitted thereto via the wireless network 108 for the control thereof. Output devices 346 may include any suitable type of device for outputting data from a mobile device 102, such as a speaker, remote control, headset, tactile feedback device, etc.

According to an exemplary embodiment, the input device 344 may include at least a camera or other type of optical imaging device configured to capture a current view or live rendering of the physical environment 100. In some cases, the live rendering may be such that, as the user moves the mobile device 102, the live rendering may update based on the movement of the mobile device 102, such as to display new portions of the physical environment 100 captured by the mobile device 102. For instance, the live rendering may be an image capture of the physical environment 100 based on what may be captured by a camera of the mobile device 102, where the image updates based on the movement of the camera and/or the mobile device 102 within the physical environment.

Figure 4:
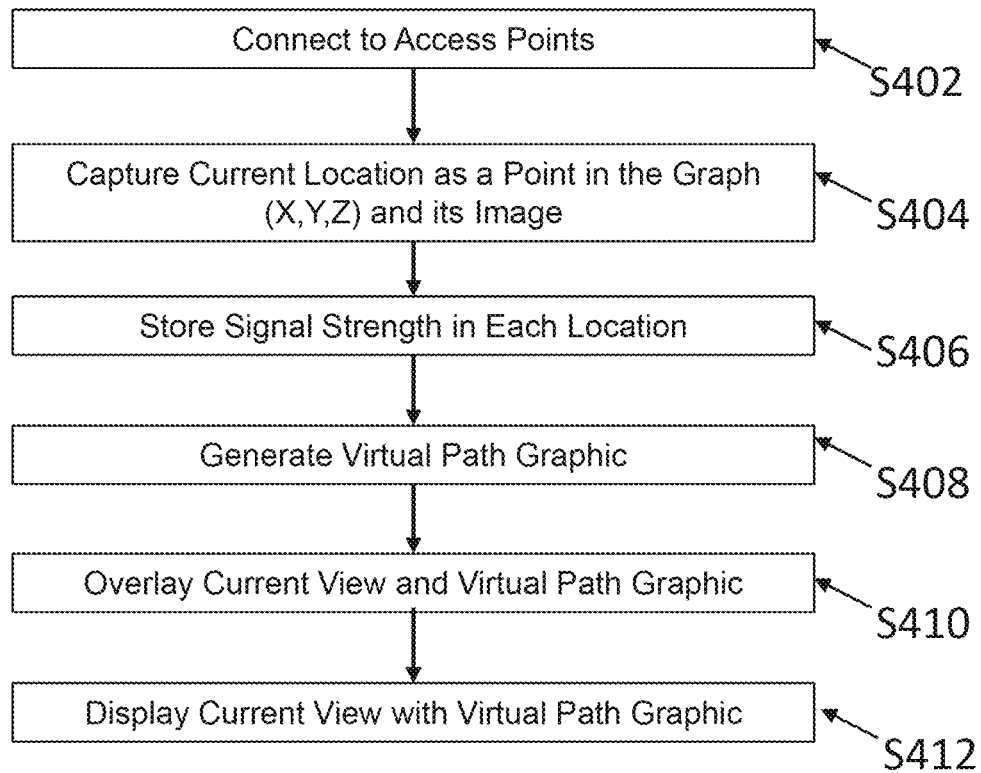
FIG. 4 is an exemplary method for generating an augmented reality Wi-Fi coverage path in accordance with an exemplary embodiment of the present disclosure.

FIG. 4 is an exemplary method 400 for generating an augmented reality Wi-Fi coverage path in accordance with an exemplary embodiment of the present disclosure.

In step 402, the mobile device 102 connects to a communication link 104 generated by one of a plurality of wireless access points AP-n based on a location of the mobile device in the physical environment 100 via the communications interface 304. The mobile device 102 determines the signal strength of each access point AP-n at a particular location and stores both the signal strength and location in the memory 308 as a point in the graph (X,Y,Z) and its image (step 404). According to an exemplary embodiment, the mobile device 102 can measure other qualities of the communication link 104 and/or access point AP-n and store this along with location data to memory 308. In another embodiment, the mobile device 102 receives a strength or quality measurement of the communication link from another device connected to the LAN.

In step 406, the input device 344, such as a video camera, of the mobile device 102 may capture a live rendering of the physical environment 100 as the mobile device 102 moves to different locations within or moves through the physical environment 100. According to an exemplary embodiment, live video images captured by the input device 344 from multiple locations and/or directions can be stitched together by the processor 320 and stored to the memory 308.

In step 408, the processor 320 of the mobile device 102 can generate a virtual path graphic. The virtual path graphic can be generated by the processor 320 linearly connecting one or more past coordinate readings of the mobile device 102 to a current location. The virtual path can include one or more colors and/or textures for indicating the signal quality associated with an access point AP-n at a specified location in the physical environment 100. The value of signal strength/quality can be obtained from memory 308 where it can be stored in association with a coordinate location within the physical environment 100. According to an exemplary embodiment the level of the signal strength/quality can be indicated by a specified color such as red for high level of signal strength and green for low levels of signal strength. According to an exemplary embodiment, the virtual path graphic can indicate or display wireless strength/quality by various monochromatic features and/or periodic numerical values of the quality or strength. For example, the signal strength/quality can be indicated by any combination of colors, textures, and alphanumeric indicators as desired. The exemplary indicators of the virtual path graphic can also identify transitions (e.g., improvement or decline) in signal quality or transitions in connection to a different access point AP-n.

In steps 410 and 412, a display 340 of the mobile device 102 can display an augmented reality interface which includes an overlay of the virtual path graphic onto the live rendering of the physical environment 100 captured by the input device 344. The virtual path graphic can include predetermined color coding or other indicia to indicate a level of measured signal strength/quality for an area based on the data stored in the memory 308. As already discussed, the signal strength/quality can include a plurality of sections that identify through one or more of color, texture, text, or other indicia as desired, transitions between different levels of signal strength/quality within the physical environment as well as transitions between communication links generated by different access points AP-n.

Figure 5A:
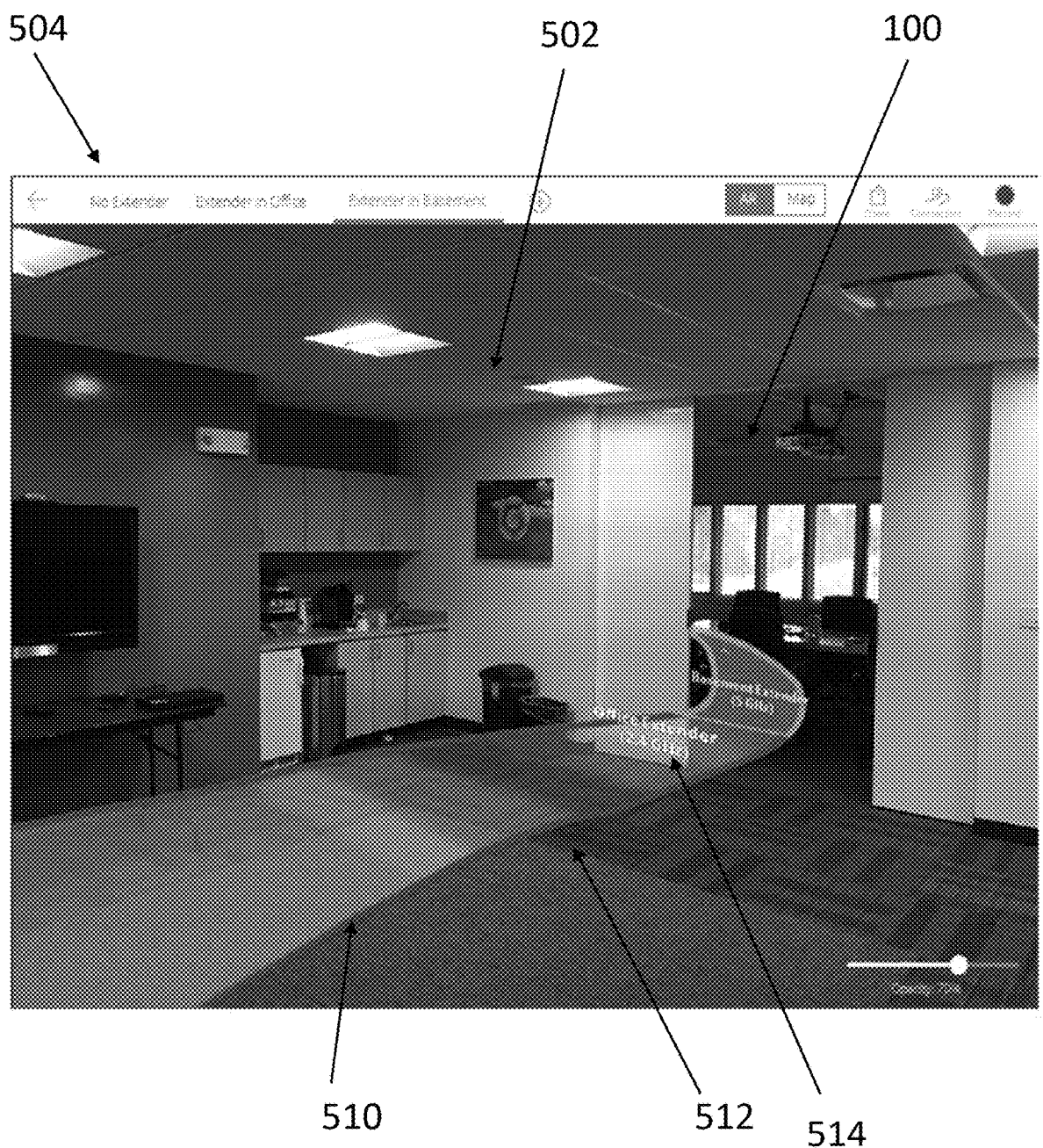
FIGS. 5A-5C illustrate an augmented reality interface of the mobile device in accordance with an exemplary embodiment of the present disclosure.
Figure 5B:
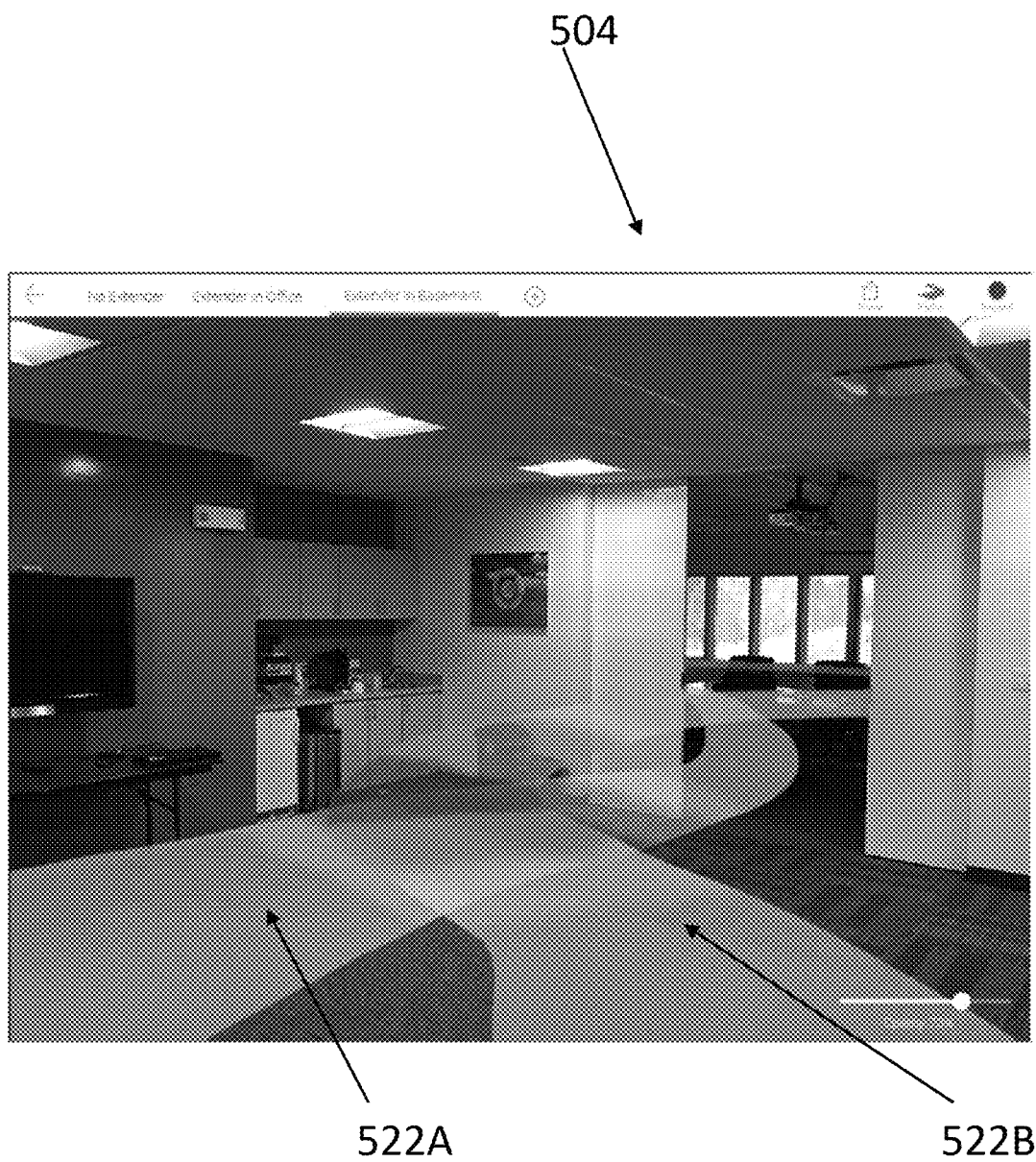
Figure 5C:
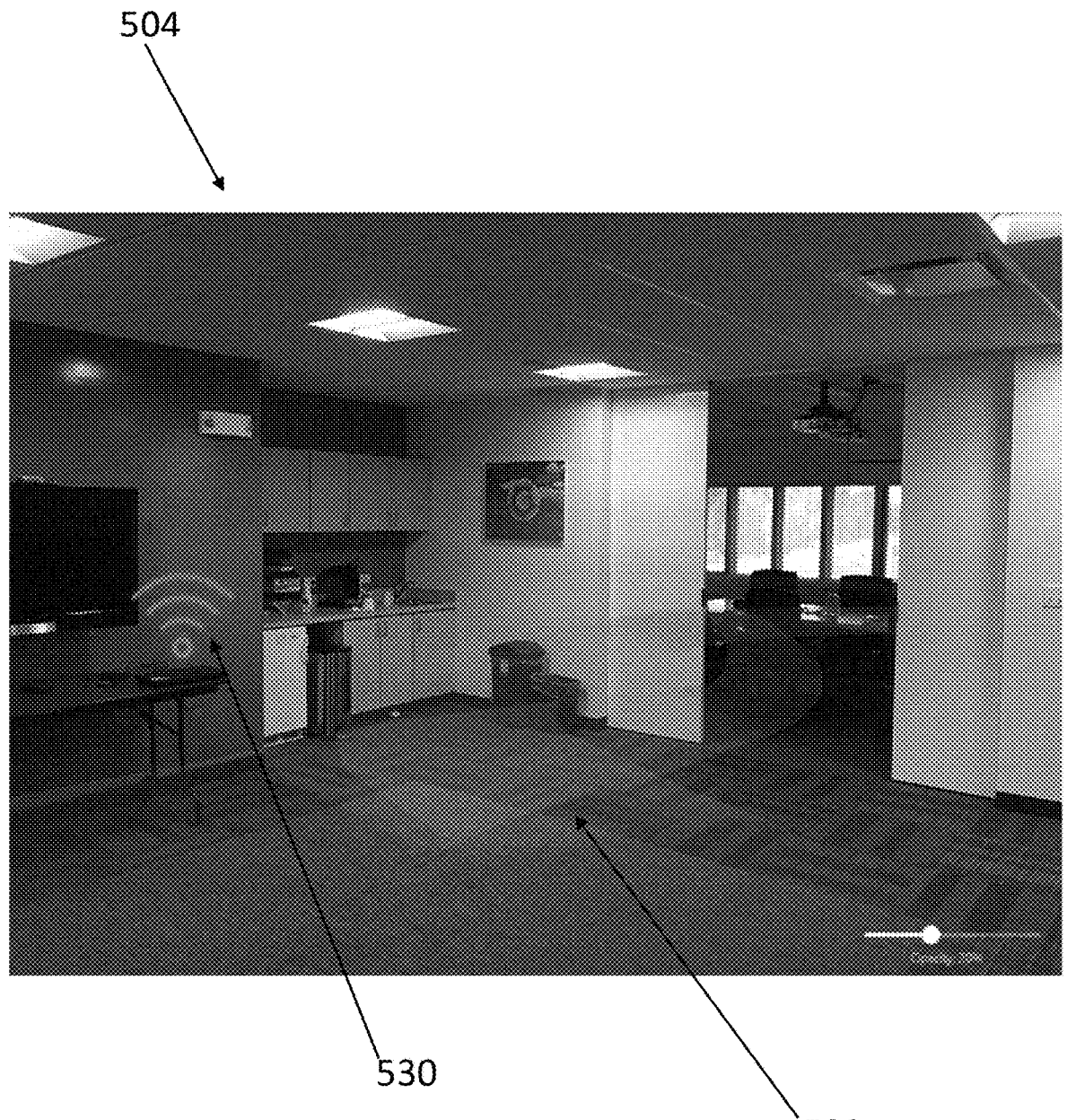

FIGS. 5A-5C illustrate an augmented reality interface of the mobile device 102 in accordance with an exemplary embodiment of the present disclosure. As shown in FIG. 5A, the augmented reality interface 504 can show the virtual path 510 overlaid on the live rendering 502 of the physical location. As already discussed, the virtual path 510 can include one or more colors and/or textures which indicate the signal strength, signal quality, and/or band (2.4 or 5 Ghz) of a specified access point AP-n. The virtual path 510 can also include alphanumeric characters which identify the specified access point to which the mobile device 102 is connected to at a specified location. As shown in FIG. 5B, an exemplary embodiment of the augmented reality interface 504 can also show more than one virtual path. For example, the augmented reality interface 504 can show a plurality of alternate travel paths 522A, 522B through the physical environment 100. Each alternate travel path 522A, 522B can include an identification of the access point AP-n to which the mobile device is connected at a specified location and the signal strength/quality of the communication links. As shown in FIG. 5C the augmented reality interface 504 can include an identification of other client devices 530 in proximity of the mobile device 102 within the physical environment 100. According to an exemplary embodiment, the client devices 530 can be identified with alphanumeric characters and any symbols or characters indicating their connection to the LAN or access point AP-n and/or the strength or quality of the network connection.

According to an exemplary embodiment to the augmented reality interface 504 can be generated as a two dimensional image. In other exemplary embodiments, the augmented reality interface 504 can be generated as a three-dimensional image providing perspective in both height and depth. As a result, an augmented reality interface 504 can identify locations where an additional wireless device would improve the network coverage in the physical environment 100. For example, according to the specified 2D or 3D display setting, the augmented reality interface 504 can identify the location according to a specified height or depth within the physical environment 100.

Figure 6:
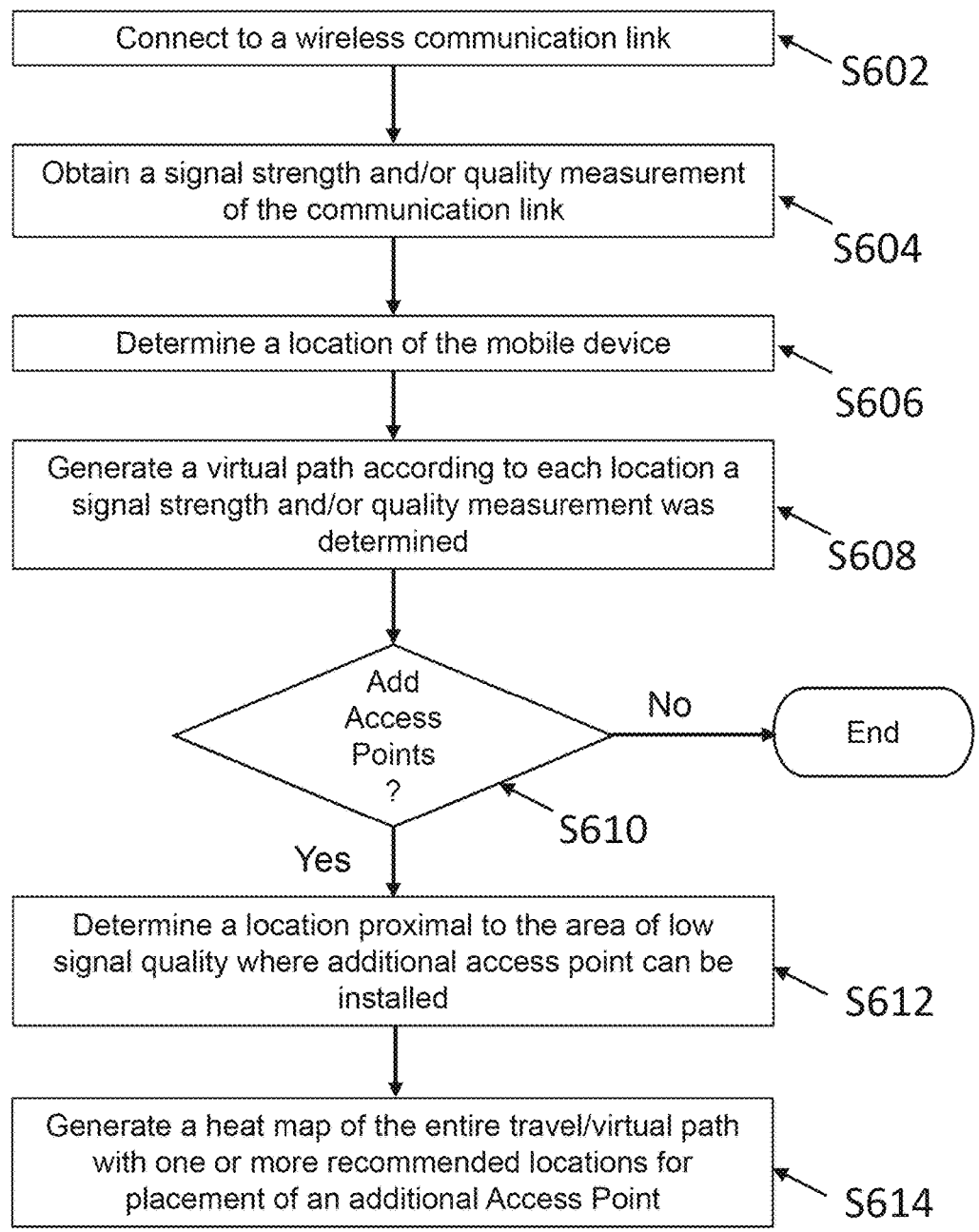
FIG. 6 illustrates an exemplary method for recommending the addition of one or more access points are for improving wireless coverage in a physical environment according to an exemplary embodiment of the present disclosure.

FIG. 6 illustrates an exemplary method 600 for recommending one or more additional access points AP-n for improving wireless coverage in a physical environment according to an exemplary embodiment of the present disclosure.

At step 602, the mobile device 102 may connect to a wireless communication link 104 of one of a plurality of access points AP-n in the physical environment 100. The mobile device 102 obtains a signal strength/quality measurement of the communication link 104 with the specified access point AP-n (step 604). The signal strength/quality measurement can be computed via the analysis module 324 of the mobile device 102 or can be obtained from a remote device connected to the LAN. The mobile device 102 can also be configured to determine a location of the mobile device 102 at various points within the physical environment 100 (step 606). The signal strength/quality measurement can be stored in memory 308 in association with the determined coordinate or location of the mobile device 102 within the physical environment 100. At step 608, the mobile device 102 can generate a virtual path 504 according to each location within the physical environment 100 at which a signal strength/quality measurement was determined. The mobile device 102 can compare the signal strength/quality to a predetermined threshold, to determine whether additional access points should be installed in the physical environment to improve the Wi-Fi coverage in certain locations (step 610). Exemplary signal strength threshold ranges according to an embodiment can include:

<=−40 dBM and >65 dBm Great
<=−65 dBM and >70 dBM Very Good
<=−70 dBM and >80 dBM Okay
<=−80 dBm and >90 dBM Poor
<=−90 dBm Very Poor Not Usable If it is determined that an additional access point AP-n should be added, the mobile device 102 can query the device database 310 to determine a location proximal to the area of low signal quality where the additional access point AP-n can be installed (step 612). For example, according to an exemplary embodiment, the mobile device 102 can capture images of the area of low signal quality and perform image recognition to identify physical features or structures in or near the area of low signal quality for mounting the additional access point. The query can be used to further identify the physical features and/or structures such as power outlets, Ethernet ports, or other features in the physical environment as desired. The mobile device 102 can generate a heat map 510 which displays the entire travel/virtual path of the mobile device 102 within the physical environment 100 along with one or more recommended locations for placement of an additional access point AP-n to improve wireless coverage (step 614), the mobile device 102 can communicate through the communication interface 304 to a remote computing device connected to the LAN or, WAN. The remote computing device can receive the signal strength/quality measurements from the mobile device 102 and determine one or more locations within the physical environment 100 where an additional access point AP-n can be installed to improve wireless coverage throughout the physical environment 100. The remote computing device can send the determination of recommended placement or mounting of the one or more additional access points AP-n to the mobile device 102 over the LAN.

FIG. 7, illustrates an exemplary method for indicating the best wireless band and indicating if an additional access point AP-n is needed for a plurality of locations in a physical environment according to an exemplary embodiment of the present disclosure.

At step 702, the mobile device 102 launches an application or a program for performing an exemplary embodiment of the present disclosure. The mobile device 102 is moved through the Environment 100 and performs a signal strength/quality measurement of the communication link 104 at each of a plurality of positions (step 704). At each location the best wireless band, such as but not limited to 2.4 or 5 Ghz (step 706) and records this signal strength/quality, best wireless band, and position (step 708). The position, signal strength/quality can be recorded in memory 308 as a directed graph.

At step 710, the mobile device 102 determines if an additional access point AP-n is needed which in an exemplary embodiment can be an extender. The mobile device's analysis module 324 can compare the signal strength of the signal for each band (such as 2.4 or 5 Ghz) and determine if any of the bands have a signal strength that is more than a predetermined threshold such as an okay signal or greater (see above for exemplary signal strength threshold ranges). If the signal for all bands is less than the threshold, then the need for an additional access point is recorded at the current position by the mobile device 102 in its memory 308 (step 712).

At step 714, the mobile device 102 detects if there are any additional devices 530 in the vicinity of its current position in the physical environment 100. The analysis module 324 analysis the detected signal radiated from the additional devices 530 and determines their identity by analyzing the signal for their MAC addresses, IP addresses, and/or other means for identifying a networked device. Alternatively they can be detected by the analysis module 324 through image data using image recognition. The identity is then determined by accessing the device database 310 and this identity and the device's signal strength is recorded at the current position of the mobile device 102. Alternatively the mobile device can determine the position and direction based on signal strength and triangulation and record the proximate physical location of the additional device 530.

At step 716, the mobile device 102 determines If measurements and recommendations have been made and recorded for each position. In an exemplary embodiment this determination could be made by the user entering a starting and stopping point in the mobile device 102 when the application was launched in step 702. Alternatively the device could determine that it has been stationary for a set threshold of time, for example 30 seconds, and then proceed to step 720. If the measurements and recommendations have not been made for each position, steps 706-716 are repeated for additional positions (step 718).

Upon recording measurements and recommendations at each position (step 716), the method proceeds to step 720. At step 720, the mobile device's processor 320 draws a path 522 that includes any recommendation for additional access points AP-n and an Indication of the best band 514 as shown in FIG. 5A.

According to an exemplary embodiment, the method of FIG. 7 can be performed by a computing system having one or more processors configured to the following program or software code:

```
//Enum of the 2.4 or 5 or dual bands
Enum WiFiFrequencyBand {
   Band24Ghz;
   Band5Ghz;
   BandDual; //both bands are suitable at a specific location
}
//Position of a path in 3Dimensions
Class Position {
   double x, y, z;
}
//A specific point in the graph that has the position data, recommended WiFi Quality information
and its neighboring positions
Class PathNode {
   int nodeId; //unique identifier of a path position
   Position position; //location coordinates of this path
   Map <Router, WiFiFrequencyBand> recommendedWiFiConnection; //2.4 or 5Ghz that is
stronger at this position and with the main router or extender
   PathNode[ ] edges; //adjacent nodes
}
//The path graph
Class WiFiPathGraph {
   public ArrayList<pathNodes>; OR
   public PathNodes[ ] pathNodes; // in simple terms
}
Class ClassifiedDevice {
   String type; //Type of device like Laptop, TV, Monitor etc...
   int signalstrength; //Signalstrength at that location
   Position position;
   WiFiFrequencyBand band; //bestBand
}
//The main class that allows the app to walk through and record the WiFiQuality at each position
captured
//And recommend if an extender is needed or not
Class WiFiPathWithAR {
   WiFiPathGraph WiFiPathGraph;
   //Read WiFi quality data for a given band
   Map<String,Object> readWiFiQualityDataFromGateway(WiFiFrequencyBand) {
       Make a connection to the router
       Even if the network is combined, the signalStrength can be read from the specific
bands as internally the networks are separate but with the same name.
       Read the following from the router and return a Map of these:
       WiFiFrequencyBand band,
       int SignalStrength;
       int packetLoss;
       int SNR;
       int MCSRate;
       Map<String, Object> wifiQualityDataFromGateway;
       return wifiQualityDataFromGateway<String, Object>;
   }
   WiFiFrequencyBand compareWiFiQualityData(Map<String,Object> band24 ,
   Map<String,Object> band5) {
       //TODO Define Threshold values that are tolerable for a good connection
       static int minSignalStrenthThreshold;
       static int minPacketLossThreshold;
       static int minSNRThreshold;
       static int minMCSRate;
       //Use the main parameter of Signalstrength to identify a dead spot.this can be
       expanded.
       if(band24.get("SignalStrength") && band5.get("SignalStrength") <
   minSignalStrengthThreshold)
           return null; //recommend an extender
       //TODO: Expand to show the comparison
       Compare SignalStrength, packetLoss, SNR between the data from the 2 bands
       against the thresholds and determine which one is better
```

```
        //Also can identify number of devices connected to each of the band to ensure
        one band is not overcrowded
        Return WiFiFrequencyBand.Band24Ghz
        Or
        Return WiFiFrequencyBand.Band5Ghz
        Or
        Return WiFiFrequencyBand.BandDual; //both are idle for that spot
    }
    //Read 3D dimension data with AR
    Position getCurrentPositionUsingAR( );
    //TODO can be extended to show how to identify the device
    ClassifiedDevice identifyDevice( ){
        Using fingerprinting or machine learning identify a device pointed to.
        Read from router the signalstrength at the device's location and band
        return classifiedDevice;
    }
    // A utility function to create/update an edge in an directed graph
    void addEdge(Position, WiFiFrequencyBand, isExtenderRecommended);
    // the main method that records the WiFi Quality
    void drawWiFiPath( ) {
    while(Repeat until the entire area is covered) {
        Position position = getCurrentPositionUsingAR( );
        //The device will be connected to only one of the bands. Either switch the device
        to the other band or read the data AS IF the device is connected to the other
        band from the router. TODO record how to handle a combined network.
        Map<String,Object> band24 =
        readWiFiQualityDataFromGateway(WiFiFrequencyBand.Band24Ghz);
        Map<String,Object> band5
        = readWiFiQualityDataFromGateway(WiFiFrequencyBand.Band5Ghz);
        WiFiFrequencyBand = compareWiFiQualityData(band24, band5);
        if (band == null) //dead spots
        then
            Recommend an extender
            Record pathGraph making a note that this spot requires an extender.
            wiFiPathGraph.addEdge(position, WiFiFrequencyBand, true);
            //Show the path in AR with a dead spot
        else
            wiFiPathGraph.addEdge(position, WiFiFrequencyBand, false);
            //Show the path in AR with the appropriate band color
        }
    }
    //Utility method to draw the path Graph as a 3D view with a path color
    void printWiFiPathGraph( );
    //Addons - get a floor plan
    Image getFloorPlanImage( );
    // AddOnes - Get WiFi Path with the recommended extenders in place
    WiFiPathGraph drawWiFiPathWithExtenders( );
}
```

Figure 8A:
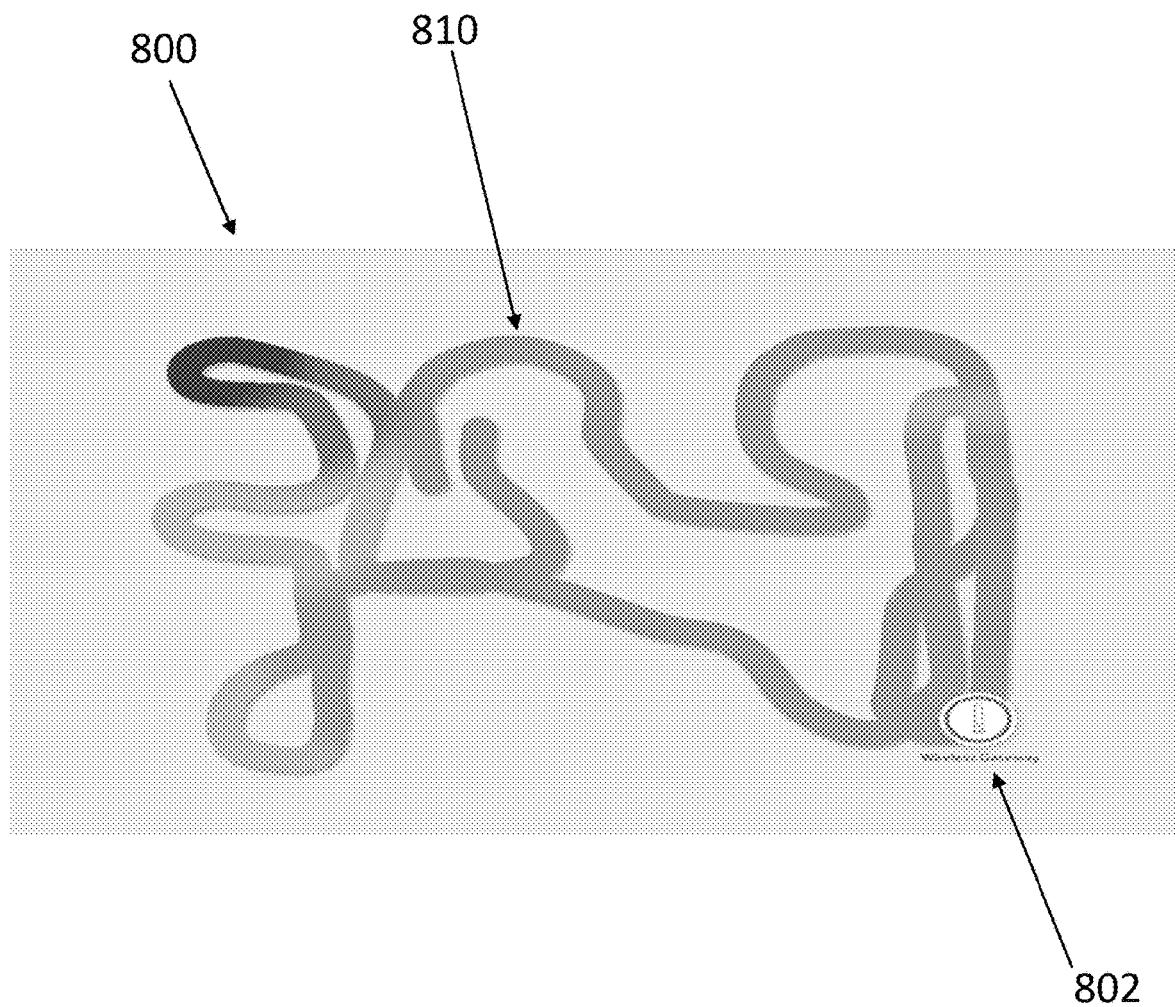
FIG. 8A illustrates a heat map of a virtual path showing the location of an existing access point in a physical environment in accordance with an exemplary embodiment of the present disclosure.

FIG. 8A illustrates a heat map 800 of the virtual path graphic including the location of an existing access point AP-n in accordance with an exemplary embodiment of the present disclosure.

As shown in FIG. 8A, the heat map 800 can be color coded to show the signal strength/quality of the respective communication links of the one or more access points 802 along the travel/virtual path 810 in the physical environment 100. As already discussed, the indicia provided on the virtual path graphic can show transitions between the communication links of the access points AP-n and/or the transitions between communication links of different signal strength/quality along the travel/virtual path 810.

Figure 8B:
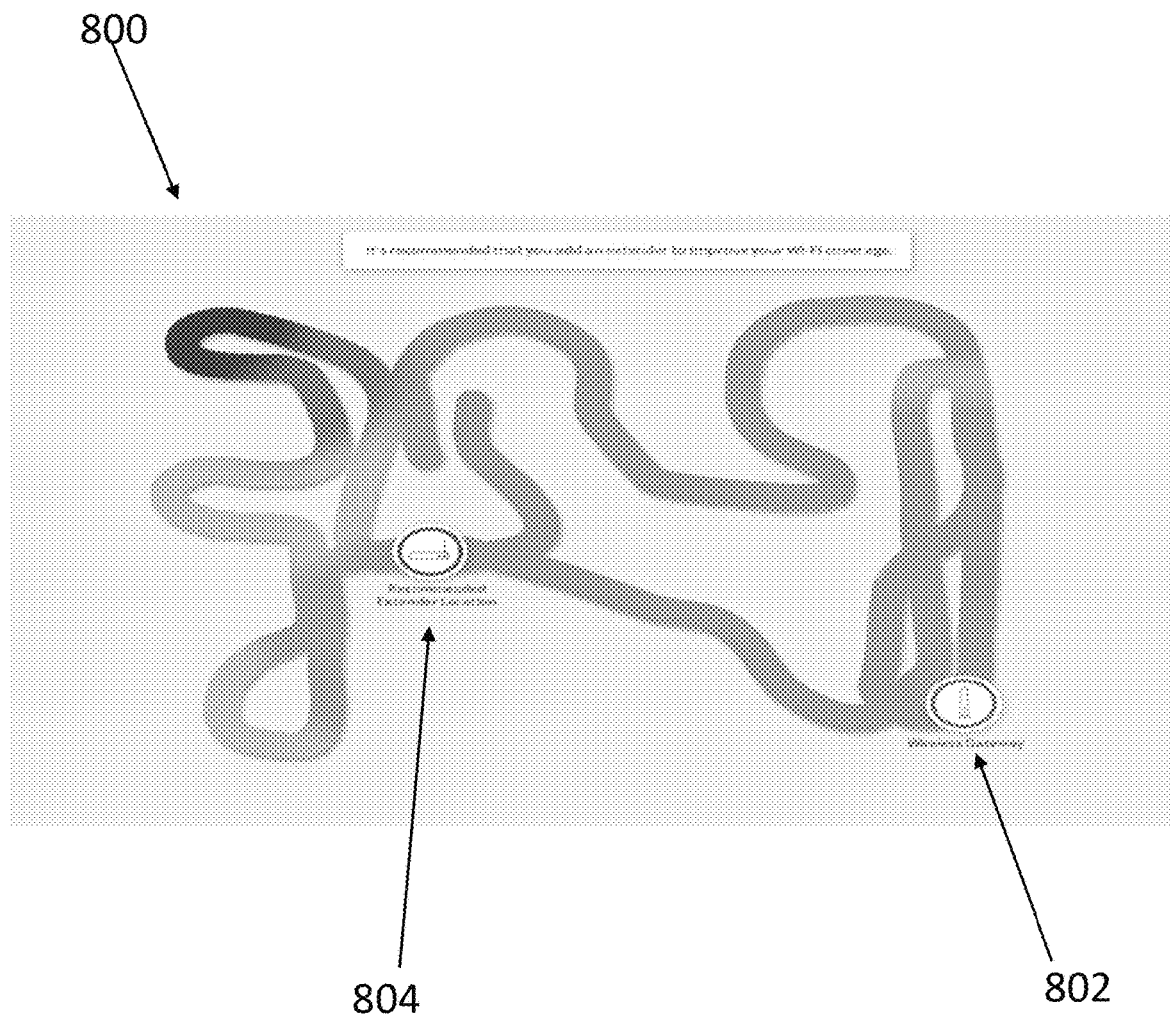
FIG. 8B illustrates the heat map of FIG. 8A showing a recommended location for an additional access point in the physical environment in accordance with an exemplary embodiment of the present disclosure.

FIG. 8B illustrates the heat map of FIG. 8A additionally showing a recommended location for an additional access point in the physical environment in accordance with an exemplary embodiment of the present disclosure. As shown in FIG. 8B, the heat map 800 can also identify a recommend location of the additional one or more access points AP-n 804 within the physical environment 100. Also a preview can be provided to show how the network will look if the recommended access point AP-n is provided. The recommendation can also identify a mounting component or structure, such as a power source, table, shelf, or other structural feature as desired onto which the additional access point(s) can be mounted or connected to for services.

Techniques consistent with the present disclosure provide, among other features, systems and methods for showing the signal strength of a wireless network throughout a physical environment 100 and making suggestions for future placement of wireless devices. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for determining quality of a wireless network, the method comprising:
   connecting, by a mobile device, to one or more access points of the wireless network in a physical environment;
   generating, by the mobile device, a rendering of the physical environment;

detecting, via the mobile device, a signal quality of the connection to each of the one or more access points of the wireless network in the physical environment;

storing, in memory of the mobile device, each current position and a plurality of previous positions of the mobile device in the physical environment in association with the detected signal quality; and generating, in a processor of the mobile device, a virtual path graphic by linking the current positions and the plurality of previous positions of the mobile device in the physical environment.

2. The method of claim 1, comprising:

overlaying, in the processor of the mobile device, the virtual path graphic onto the rendering of the physical environment, the virtual path graphic including at least an indicator of the signal quality of each access point to which the mobile device is connected at respective current and previous positions; and displaying, via a display of the mobile device, an augmented reality interface according to the virtual path graphic overlaid onto the rendering of the physical environment.

3. The method of claim 1, further comprising:

receiving, at each current position by the mobile device, signal quality measurements from the one or more access points;

analyzing, in the processor of the mobile device, the signal quality measurements to determine whether one or more additional access points are needed in the physical environment;

determining, by the mobile device, an area within the physical environment where at least one additional access point is needed; and generating, by the mobile device, a recommendation for the at least one additional access point, the recommendation including a suggested placement of the at least one additional access point in the area of the physical environment.

4. The method of claim 3, wherein analyzing the signal quality measurements includes:

comparing, by the mobile device, the signal quality measurements to a predetermined threshold; and wherein the determining at least one additional access point is needed includes:

determining, by the mobile device, the signal quality measurements are below the predetermined threshold.

5. The method of claim 3, comprising:

in response to the determining at least one additional access point is needed in the area of the physical environment, capturing, by the mobile device, images of the area;

identifying, by the mobile device, one or more physical features or structures in or near the area for mounting the additional access point;

storing, by the mobile device, the one or more physical features or structures in a device database; and wherein the generating the recommendation for the at least one additional access point includes:

querying, by the mobile device, the device database for the one or more physical features or structures; and wherein the suggested placement of the at least one additional access point includes the one or more physical features or structures.

6. The method of claim 3, wherein the suggested placement of the at least one additional access point is within a specified distance of the area.

7. The method of claim 5, wherein the one or more physical features or structures in or near the area for mounting the additional access point are identified using image recognition.

8. The method of claim 3, wherein the recommendation is included on virtual path graphic.

9. The method of claim 3, wherein the analyzing the signal quality measurements to determine whether one or more additional access points are needed in the physical environment includes:

analyzing, by the mobile device, the signal quality measurements in two or more signal bands.

10. A mobile device, comprising:

a receiver configured to connect to one or more access points of a wireless network in a physical environment;

a processor configured to generate a rendering of the physical environment;

an interface configured to detect a signal quality of the connection to each of the one or more access points;

a memory configured to store each current position and a plurality of previous positions in association with the detected signal quality; and the processor configured to generate a virtual path graphic by linking the current positions and the plurality of previous positions of the mobile device in the physical environment.

11. The mobile device of claim 10, comprising:

the processor configured to overlay the virtual path graphic onto the rendering of the physical environment, the virtual path graphic including at least an indicator of the signal quality of each access point to which the mobile device is connected at respective current and previous positions; and a display configured to display an augmented reality interface according to the virtual path graphic overlaid onto the rendering of the physical environment.

12. The mobile device of claim 9, wherein:

the receiver is configured to receive at each current position by the mobile device, signal quality measurements from the one or more access points, the processor is configured to analyze the signal quality measurement to determine whether one or more additional access points are needed in the physical environment;

the processor configured to determine an area within the physical environment where at least one additional access point is needed; and the processor configured to generate a recommendation for the at least one additional access point, the recommendation including a suggested placement of the at least one additional access point in the area of the physical environment.

13. The mobile device of claim 12, wherein the analyzing the signal quality measurements includes:

the processor configured to compare the signal quality measurements to a predetermined threshold; and wherein the determining at least one additional access point is needed includes:

the processor configured to determine the signal quality measurements are below the predetermined threshold.

14. The mobile device of claim 12, comprising:

in response to the determining at least one additional access point is needed in the area of the physical environment, the camera configured to capture images of the area;

the processor configured to identify one or more physical features or structures in or near the area for mounting the additional access point;

the processor configured to store the one or more physical features or structures in a device database; and wherein the generating the recommendation for the at least one additional access point includes:

the processor configured to query the device database for the one or more physical features or structures; and wherein the suggested placement of the at least one additional access point includes the one or more physical features or structures.

15. A non-transitory computer readable medium having instructions operable to cause one or more processors to perform operations comprising:

connecting to one or more access points of the wireless network in a physical environment;

generating a rendering of the physical environment;

detecting a signal quality of a connection to each of the one or more access points of the wireless network in the physical environment;

storing, each current position and a plurality of previous positions of the mobile device in the physical environment in association with the detected signal quality; and generating a virtual path graphic by linking the current positions and the plurality of previous positions of the mobile device in the physical environment.

16. The non-transitory computer readable medium of claim 15, comprising:

overlaying the virtual path graphic onto the rendering of the physical environment, the virtual path graphic including at least an indicator of the signal quality of each access point to which the mobile device is connected at respective current and previous positions; and displaying an augmented reality interface according to the virtual path graphic overlaid onto the rendering of the physical environment.

17. The non-transitory computer readable medium of claim 15, further comprising:

receiving, at each current position, signal quality measurements from the one or more access points;

analyzing the signal quality measurements to determine whether one or more additional access points are needed in the physical environment;

determining an area within the physical environment where at least one additional access point is needed; and generating a recommendation for the at least one additional access point, the recommendation including a suggested placement of the at least one additional access point in the area of the physical environment.

18. The non-transitory computer readable medium of claim 17, wherein the analyzing the signal quality measurements includes:

comparing the signal quality measurements to a predetermined threshold; and wherein the determining at least one additional access point is needed includes:

determining the signal quality measurements are below the predetermined threshold.

19. The non-transitory computer readable medium of claim 17, comprising:

in response to the determining at least one additional access point is needed in the area of the physical environment, capturing, by the mobile device, images of the area;

identifying one or more physical features or structures in or near the area for mounting the additional access point;

storing the one or more physical features or structures in a device database; and wherein the generating the recommendation for the at least one additional access point includes:

querying the device database for the one or more physical features or structures; and wherein the suggested placement of the at least one additional access point includes the one or more physical features or structures.

20. The non-transitory computer readable medium of claim 17, wherein the recommendation is included on virtual path graphic.

21. A method for determining quality of a wireless network, the method comprising:

connecting, by a mobile device, to one or more access points of the wireless network in a physical environment;

generating, by a mobile device, a rendering of the physical environment;

detecting, via the mobile device, a signal quality of the connection to each of the one or more access points of the wireless network in the physical environment;

storing each current position and a plurality of previous positions of the mobile device in the physical environment in association with the detected signal quality; and displaying a virtual path graphic that links the current positions and the plurality of previous positions of the mobile device in the physical environment.

22. The method of claim 21, comprising:

overlaying the virtual path graphic onto the rendering of the physical environment, the virtual path graphic including at least an indicator of the signal quality of each access point to which the mobile device is connected at respective current and previous positions; and displaying an augmented reality interface according to the virtual path graphic overlaid onto the rendering of the physical environment.

23. The method of claim 21, further comprising:

receiving, at each current position by the mobile device, signal quality measurements from the one or more access points;

analyzing the signal quality measurements to determine whether one or more additional access points are needed in the physical environment;

determining an area within the physical environment where at least one additional access point is needed; and generating, a recommendation for the at least one additional access point, the recommendation including a suggested placement of the at least one additional access point in the area of the physical environment.

24. The method of claim 23, wherein the analyzing the signal quality measurements includes:

comparing, the signal quality measurements to a predetermined threshold; and wherein the determining at least one additional access point is needed includes:

determining, the signal quality measurements are below the predetermined threshold.

25. The method of claim 23, comprising:
in response to the determining at least one additional access point is needed in the area of the physical environment, capturing, by the mobile device, images of the area;
identifying one or more physical features or structures in or near the area for mounting the additional access point;
storing the one or more physical features or structures in a device database; and
wherein the generating the recommendation for the at least one additional access point includes:
querying the device database for the one or more physical features or structures; and
wherein the suggested placement of the at least one additional access point includes the one or more physical features or structures.

26. The method of claim 23, wherein the suggested placement of the at least one additional access point is within a specified distance of the area.

27. The method of claim 25, wherein the one or more physical features or structures in or near the area for mounting the additional access point are identified using image recognition.

28. The method of claim 23, wherein the recommendation is included on virtual path graphic.

29. The method of claim 23, wherein the analyzing the signal quality measurements to determine whether one or more additional access points are needed in the physical environment includes:
analyzing, the signal quality measurements in two or more signal bands.

30. The method of claim 21, wherein each current position and a plurality of previous positions of the mobile device in the physical environment in association with the detected signal quality is stored in a cloud-based storage.

* * * * *